United States Patent [19]
Scott et al.

[11] Patent Number: 5,785,157
[45] Date of Patent: Jul. 28, 1998

[54] PARK BRAKE APPARATUS FOR VEHICLE ELECTRIC BRAKE

[75] Inventors: Curtis Albert Scott; William Frank Borchers, both of Beavercreek; Gustavus Pearl Bock, Bellbook, all of Ohio

[73] Assignee: General Motors Corporation, Detroit, Mich.

[21] Appl. No.: 828,011

[22] Filed: Mar. 27, 1997

[51] Int. Cl.$^6$ .................................................. F16D 65/27
[52] U.S. Cl. .................... 188/156; 188/162; 188/163; 310/77
[58] Field of Search .................... 188/156, 157, 188/158, 161, 162, 163, 325, 327, 328, 106 P, 138; 310/77

[56] References Cited

U.S. PATENT DOCUMENTS

| | | | |
|---|---|---|---|
| 3,556,266 | 1/1971 | McCarthy | 188/171 |
| 3,648,139 | 3/1972 | Friedman | 318/265 |
| 3,712,467 | 1/1973 | Barnes | 209/110.5 |
| 3,754,623 | 8/1973 | Gatt | 188/156 |
| 4,029,159 | 6/1977 | Nymann | 173/163 |
| 4,149,430 | 4/1979 | F'Geppert | 74/424.8 R |
| 4,303,835 | 12/1981 | Bair | 290/55 |
| 5,000,297 | 3/1991 | Shaw et al. | 188/156 |
| 5,024,299 | 6/1991 | Shaw et al. | 188/156 |
| 5,219,049 | 6/1993 | Unterborn | 188/156 |
| 5,310,026 | 5/1994 | Shaw et al. | 188/156 |

*Primary Examiner*—Chris Schwartz
*Attorney, Agent, or Firm*—Anthony Luke Simon

[57] ABSTRACT

A park brake apparatus for a vehicle electric brake comprises an electric motor having a rotational output shaft coupled to a brake mechanism. Rotational movement of the electric motor in a first direction causes application of brake force in the brake mechanism and rotational movement of the electric motor in a second direction opposite the first direction causes release of brake force in the brake mechanism. An armature for the electric motor includes a plurality of radially extending armature arms. A solenoid has a plunger movable between extended and retracted positions. In the retracted position, the plunger is free of the radially extending armature arms and the armature spins free of the plunger. In the extended position, the plunger engages the radially extending armature arms, locking the armature in place and maintaining a park brake state.

4 Claims, 3 Drawing Sheets

PARK BRAKE APPARATUS FOR VEHICLE ELECTRIC BRAKE

This invention relates to a park brake apparatus for a vehicle electric brake.

BACKGROUND OF THE INVENTION

Various patent publications, such as U.S. Pat. Nos. 5,310,026, 5,219,049, 5,024,299 and 5,000,297, all assigned to the assignee of this invention, describe electric brake apparatuses in which a drum brake is controlled by an electric motor whose rotational motion is translated into linear motion to controllably engage the brake shoes against the drum of the drum brake.

Electric drum brakes typically include parking brake mechanisms. In one example a parking brake motor drives a sector gear that moves a cam to engage the friction brakes, locking the electric brake motor in place with the shoes maintaining friction engagement against the drum to effect the parking brake function. Another example includes a coil spring wound around a drum on the shaft of the brake motor. The coil spring is activated by an actuator to unwind the spring from the shaft and allow the rotation of the drum, which releases the parking brake.

SUMMARY OF THE PRESENT INVENTION

It is an object of this invention to provide a park brake apparatus for a vehicle electric brake according to claim 1.

Advantageously, this invention provides a park brake apparatus for a vehicle electric brake that uses an electric motor to move the brake shoes with relation to the drum and that requires a mechanism to hold the electric motor or its output shaft in a fixed position to achieve a parking brake function. Advantageously, this invention provides a reliable mechanism for locking the electric motor of the electric drum brake in position to maintain the brake in a park brake state.

Advantageously, this invention provides a park brake mechanism for an electric motor that makes use of a bi-directional, bi-stable solenoid and plunger to selectively lock and unlock an electric brake motor. Advantageously, this invention makes use of the bi-stable, bi-directional solenoid to engage the plunger between arms of the lamina in the lamina stack of the motor armature to lock the motor in place and to lock the brake in the park brake position.

Advantageously then, a preferred example park brake apparatus for a vehicle electric brake according to this invention comprises:

an electric motor having a rotational output shaft coupled to a brake mechanism wherein rotational movement of the electric motor in one direction causes application of brake force in the brake mechanism and rotational movement of the motor in the opposite direction causes release of brake force in the brake mechanism; an armature for the electric motor including a plurality of radially extending armature arms; a solenoid having a plunger movable between extended and retracted positions, wherein, in the retracted position, the plunger is free of the radially extending armature arms and the armature spins free of the plunger and, in the extended position, the plunger engages the radially extending armature arms, locking the motor armature in place.

BRIEF DESCRIPTION OF THE DRAWINGS

The present invention will now be described by way of example with reference to the following drawings in which.

DETAILED DESCRIPTION OF THE INVENTION

Figure 1:
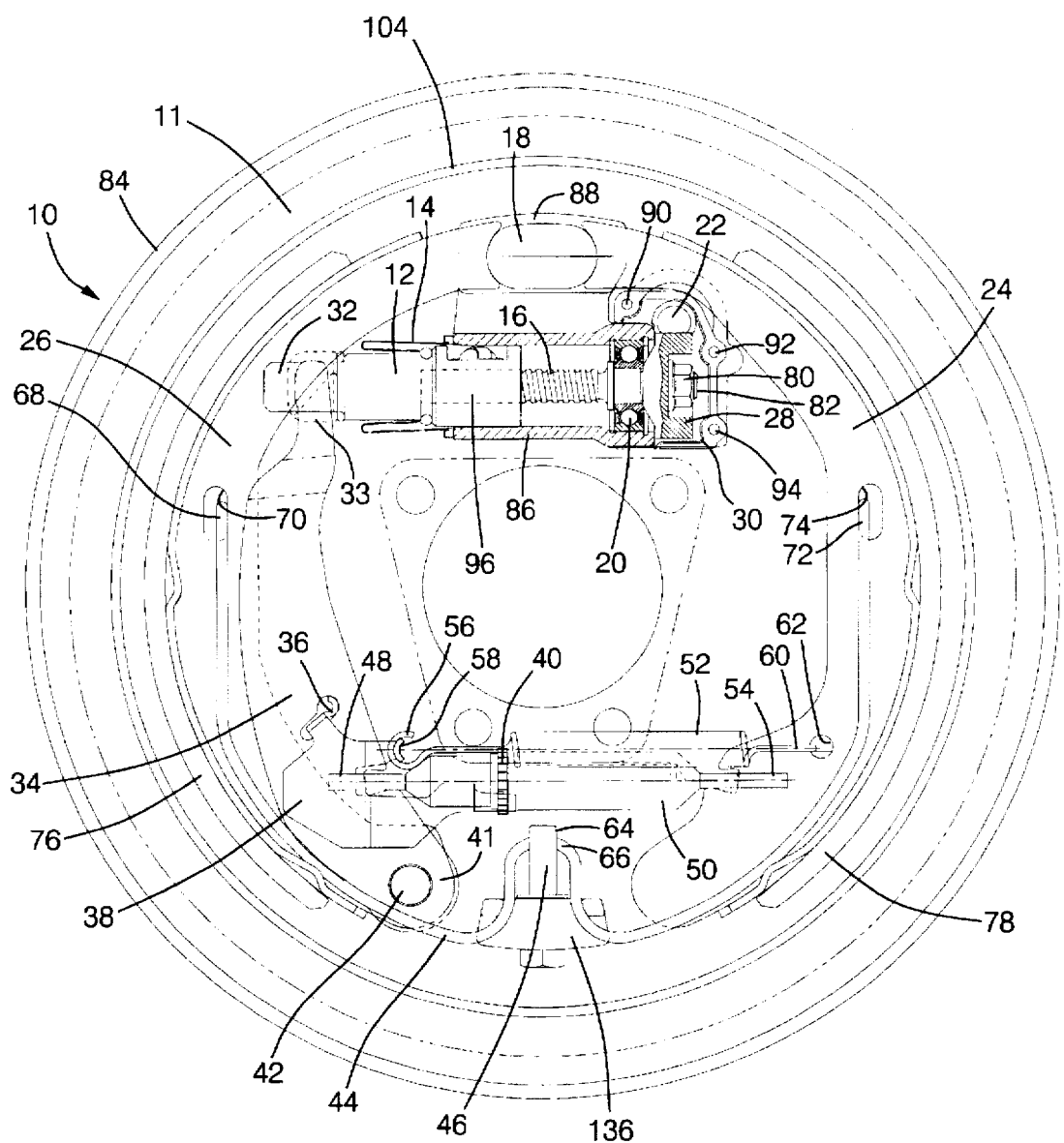
FIGS. 1 and 2 illustrate first and second views of an example electric drum brake for use with this invention.
Figure 2:
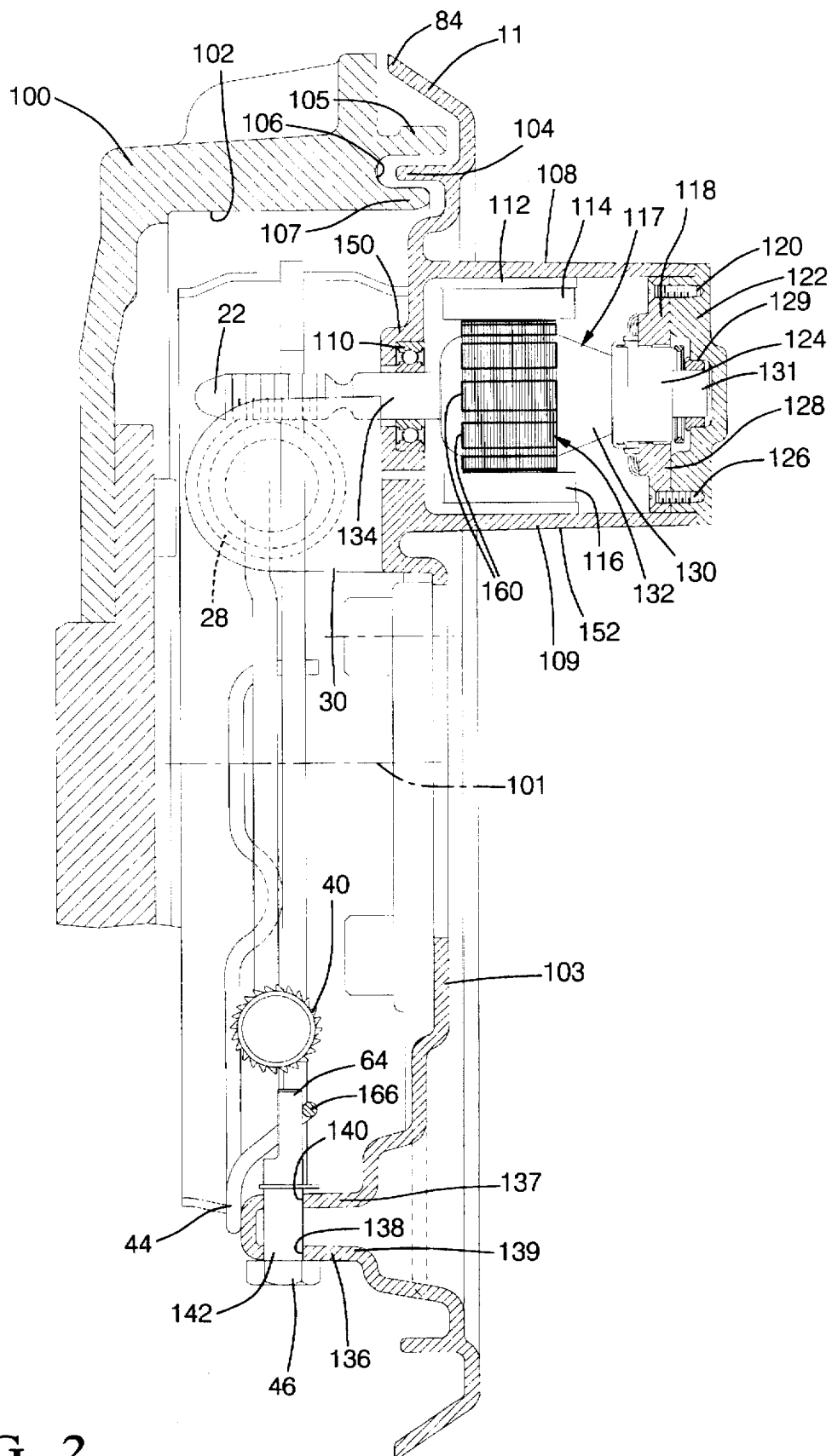

Referring to FIGS. 1 and 2, the electric drum brake shown includes the backing plate 11 and the components including the ball screw actuator 16, lever 34, adjuster/actuator 38, adjustable strut 50 and the shoes 24 and 26. The drum is omitted from FIG. 1 to allow the components mounted to the backing plate 11 to be seen.

The backing plate 11 is a single cast structure that includes the peripheral annular shield 84 and, radially interior thereof, the secondary annular shield 104. The backing plate 11 also includes, as part of the singular casting, the gear cover 30 and the retainer 136 for the spring retainer pin 46. The retainer 136 includes two parallel retainer walls 137 and 139 that extend out of backing plate 11 perpendicular to the flat disk portion 103 in a direction opposite the direction that wall 108 projects. The walls 137 and 139 include holes 140 and 138, coaxially aligned, receiving body portion 142 of retaining pin 46, aligning pin 46 vertically as shown in FIG. 2, or, more specifically, aligning the axis of retaining pin 46 parallel to the flat surface of flat disk portion 103.

The cover plate for the gear cover 30 (cover plate omitted from the view) is mounted to the gear cover 30, for example, through screws secured in threaded holes 90, 92 and 94. Underneath the gear cover 30, the helical gear 28 engages the worm gear 22 on the end of the motor armature shaft 134 (FIG. 2). Rotational motion of the worm gear 22 causes rotational motion of the helical gear 28. The helical gear 28 is secured on the end 82 of ball screw 16 by nut 80 and, as the gear 28 rotates, the ball screw 16 also rotates. The ball screw 16 is maintained in place by bearing 20 mounted in the actuator housing 86. The actuator housing 86 is secured to the backing plate 11 through its base 88, which is maintained in place by the anchor pin 18 in a known manner.

Within the actuator housing 86, ball nut 96 moves linearly in response to rotational motion of the ball screw 16. When the ball screw 16 rotates in a first direction, ball nut 96 extends linearly in a direction away from helical gear 28. When the ball screw 16 rotates in the opposite direction, ball nut 96 moves linearly in the opposite direction towards helical gear 28. Attached to the ball nut 96 is a ball screw sleeve 12 that receives the end of the ball screw 16 extending through the ball nut 96. An actuator end 32 attached to the ball screw sleeve 12 engages the end 33 of lever 34 causing the lever 34 to pivot in response to linear motion of the ball nut 96 and the actuator end 32.

Lever 34 is attached to the adjuster actuator 38 and the adjustable strut 50, which includes adjuster screw 40 and ends 48 and 54 engaging the lever 34 and the shoe 24. The adjustable strut 50 is of a type known to those skilled in the art whose axial length is adjusted by rotation of adjuster screw 40, which, in a known manner, occurs automatically by adjuster actuator 38 as the friction surfaces 76 and 78 of the brake shoes wear. Strut spring 52, having a first end 60 seated in hole 62 in shoe 24 and a second end 56 seated in a spring seat 58 of adjuster actuator 38, provides retracting force maintaining the shoes 24 and 26 engaged with the adjustable strut 50.

As rotational motion of the ball screw 16 in one direction causes extension of the actuator end 32 and the end 33 of lever 34, lever 34 pivots at the point where it engages end 48 of the adjustable strut 50 causing the end 41 of the lever 34 to move inward. Shoe 26 is pivotably attached to the end 41 of lever 34 through lever pin 32. As the end 41 of the lever 34 moves inwardly, the shoe 26 is pulled away from the brake drum. Similarly, through adjustable strut 50 and strut spring 52, the shoe 24 is also retracted away from the drum.

When the ball screw 16 rotates in the opposite direction causing the actuator end 32 to retract, the lever 34 pivots at the point where it engages the adjustable strut 50 end 48 in the opposite direction extending lever end 41. As lever end 41 extends, through lever pin 42, the shoe 26 extends toward the drum engaging the friction material 76 against the drum. Similarly, through the adjustable strut 50, shoe 24 is also extended outwardly toward the drum so that its friction surface 78 engages the drum, providing friction braking to a vehicle wheel. This type of brake configuration is known as a leading-trailing brake configuration in which shoe 24 is the primary shoe and shoe 26 is the secondary shoe.

In FIG. 2, the brake drum 100 is shown with the remainder of the brake unit. At the radial exterior of the backing plate 11, the annular dust cover 84 and annular secondary dust shield 104 are shown engaging the drum 100. The secondary dust shield 104 extends into an annular groove 106, which is formed between the annular ribs 105 and 107 on the drum 100. The result is that the features 105, 104 and 107 are interdigitated providing an effective dust and water shield for the brake unit.

Within backing plate 11, located at a point off center from the wheel axis 101, the material of the plate thickens to form a support portion 150 at which point the motor 109 is attached.

Figure 3:
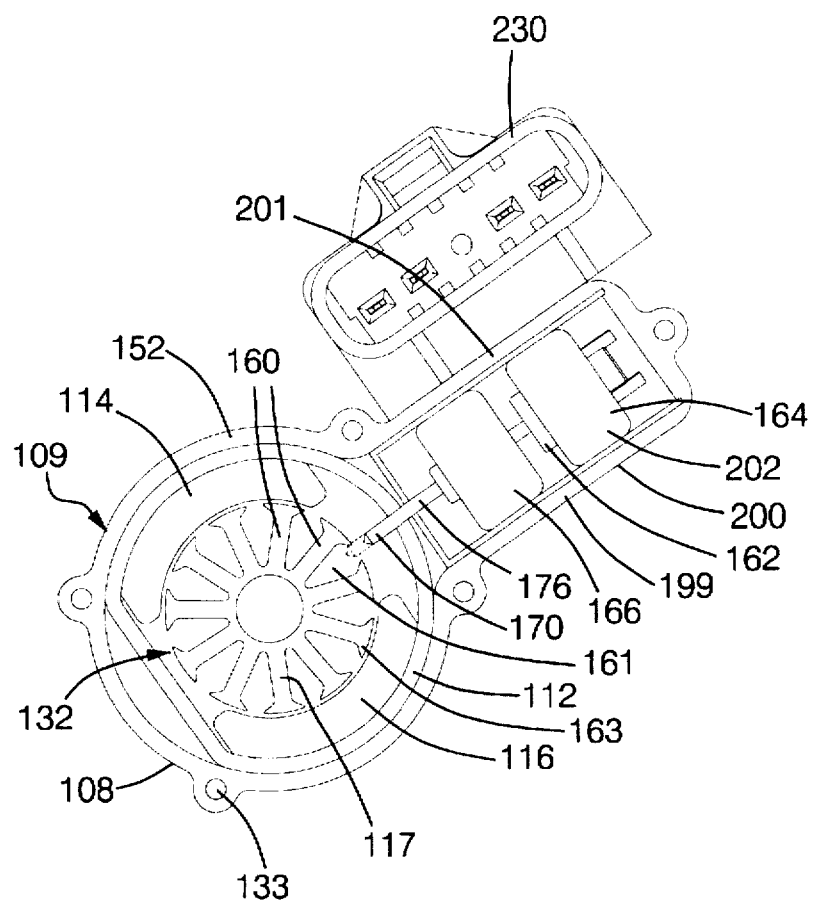
FIG. 3 illustrates a view of an example park brake apparatus according to this invention.

The housing of the motor comprises wall 108, which is integrally cast into the backing plate 11 and, as can be seen now also with reference to FIG. 3, extends from the support portion 150 as a substantially circular cylindrical projection with an open end. Within the support portion 150, bearing 110 is mounted fixedly in place and receives the worm gear end of armature shaft 134. At the opposite end of armature shaft 134, end 131 engages bushing 129 and cover plate 122, which is mounted on the end of the projecting wall 108, closing the motor housing.

Commutator 124 is provided at the end 131 of the shaft 134 and engages brushes of a known type held in place by brush holders 118 and 128, which are affixed to the end plate 122 by screws 120 and 126.

The motor armature 117, along with magnets 114 and 116 and flux ring 112 are all located within the substantially circular cylindrical wall 108.

The motor armature 117 comprises conventional armature winding 130 (omitted from FIG. 3 for clarity) and lamina stack 132 that operate together with the commutator 124 (also omitted from FIG. 3), brushes and the brush holders 118 and 128 (also omitted from FIG. 3) and magnets 114 and 116 maintained in place by flux ring 112 to provide a conventional DC brush motor 109. The rotary output of the motor 109 drives worm gear 22, which engages helical gear 28 of the ball screw and ball nut actuator.

The protruding wall 108 forming the substantially cylindrical housing for the motor 109 is not a complete circular cylinder. Instead, the wall 108 extends into walls 199 and 201, comprising part of a rectangular cylinder 200 forming the housing for the park brake solenoid motor 202. Like the motor housing 108, the rectangular cylinder 200 forming the park brake motor housing is also integrally formed with the backing plate 11. A plurality of holes 133 in walls 108, 199, 200 and 201 are tapped and provide means for mounting the cover plate 122, for example, through screws (not shown).

The lamina stack 132 has a plurality of radially extending arms 160 of a known type around and between which the armature windings are located.

The solenoid 202 is a dual position, dual stable state device typically having a central magnet 162 and primary and secondary windings 164 and 166. The solenoid magnet 162 and windings 164 and 166 are all mounted within the solenoid housing 168.

The solenoid 202 has a plunger 176 whose end 170 is shaped into a rounded cone as shown. Example solenoids 202 are well known to and commercially available to those skilled in the art and further description thereof need not be set forth in detail herein.

The plunger 176 of the solenoid 202 has two stable positions at which it can remain with the solenoid powered off. When the solenoid 202 is powered with a first signal the plunger 176 is retracted until it is in the position shown, at which position the plunger 176 is clear of the extending arms 160 of the armature 117 and the armature 117 is able to freely spin with respect to the plunger 176. Once the plunger 176 is in the position shown, power to the solenoid is terminated and the solenoid is stable with the plunger 176 maintained in the position shown.

When it is desired to activate the vehicle park brake, the motor 109 is energized and the output shaft 134 rotates, forcing the brake shoes against the brake drum to provide the frictional parking brake engagement of a drum brake 100 in a manner known to those skilled in the art. When the brake shoes are properly engaged, solenoid 202 is activated causing plunger 176 to extend end 170 and into the armature 117. If the armature 117 is in a position at which the plunger tip 172 can enter a space 161 between neighboring extending arms 160 of the armature, the plunger 176 will so extend and the end 170 will lock the motor armature 117 in place by virtue of its engagement between the consecutive legs 160 of the armature. In this extended position, the plunger 176 prevents the armature from spinning and thus maintains the electric drum brake shoes engaged against the brake drum. At this point, the motor power can be terminated to both the solenoid 14 and the electric motor 12 and the drum brake remains in the park brake state.

If, when the plunger is extended, it engages a flat end 163 of an extending arm 160, the plunger will stop against the flat end 163. When this occurs, the parking brake mechanism will still lock according to this invention as follows. After the solenoid is activated to extend the plunger, the current to the motor 109 is terminated. When the motor current ceases, back pressure from the brake mechanism acts on the electric motor, causing the armature 117 to spin until the armature 117 obtains a position at which the plunger 176 can extend its end 170 into a space 163 between neighboring arms 160 of the armature. When such position is reached, the plunger extends between the neighboring arms 160 of the armature 117, locking the armature 117 in place and maintaining the brake in the park brake state. Power to solenoid 202 can then be terminated and the brake remains stable in the park brake position until the solenoid is again activated to retract the plunger 176 free of the armature 117, releasing the brake from the park brake state.

We claim:

1. A park brake apparatus for a vehicle electric brake comprising:

an electric motor having a rotational output shaft coupled to a brake mechanism wherein rotational movement of the electric motor in a first direction causes application of brake force in the brake mechanism and rotational movement of the electric motor in a second direction opposite the first direction causes release of brake force in the brake mechanism;

an armature for the electric motor including a plurality of radially extending armature arms; and a solenoid having a plunger movable between extended and retracted positions, wherein, in the retracted position, the plunger is free of the radially extending armature arms and the armature spins free of the plunger and, in the extended position, the plunger engages the radially extending armature arms, locking the armature in place.

2. A park brake apparatus for a vehicle electric brake according to claim 1 wherein the brake mechanism is a drum brake.

3. A park brake apparatus for a vehicle electric brake according to claim 1, wherein the output shaft has a first longitudinal axis and the plunger has a second longitudinal axis, wherein the first longitudinal axis is perpendicular to the second longitudinal axis.

4. A park brake apparatus for a vehicle electric brake comprising:

an electric motor having a rotational output shaft;

an armature on the electric motor rotational output shaft;

a solenoid mounted proximate the motor; and a plunger for the solenoid, wherein the plunger has a first extended position and a second retracted position, wherein the rotational output shaft is coupled to a brake mechanism and causes application of brake force in the brake mechanism when rotated in a first direction and releases brake force in the brake mechanism when rotated in a second direction opposite the first direction, wherein the armature includes a plurality of radially extending armature arms, and wherein, in the first position, the plunger engages the radially extending armature arms, locking the armature and rotational output shaft in place and, in the second position, the plunger is free of the radially extending armature arms and the armature and rotational output shaft spin free of the plunger.

* * * * *